United States Patent [19]

Hildebrandt et al.

[11] 4,205,245
[45] May 27, 1980

[54] CENTRIFUGAL ACTUATOR FOR ELECTRIC MOTOR STARTING SWITCH

[75] Inventors: Eugene F. Hildebrandt; Herbert G. Fellner, both of St. Louis County, Mo.

[73] Assignee: Emerson Electric Co., St. Louis, Mo.

[21] Appl. No.: 927,145

[22] Filed: Jul. 24, 1978

[51] Int. Cl.² ............................................. H02K 11/00
[52] U.S. Cl. ................................ 310/68 E; 310/68 R; 200/80 R
[58] Field of Search ................. 310/68 E, 68 R, 66 R; 200/80 R

[56] References Cited

U.S. PATENT DOCUMENTS

| | | | |
|---|---|---|---|
| 3,014,142 | 12/1961 | Lee | 310/68 E X |
| 3,271,602 | 9/1966 | Waters | 310/68 |
| 3,609,421 | 9/1971 | Hildebrandt | 310/68 R |
| 3,691,415 | 9/1972 | Haucock et al. | 310/68 E |
| 3,872,691 | 3/1975 | Hildebrandt | 310/68 E X |
| 4,034,173 | 7/1977 | Crow et al. | 200/80 R |

*Primary Examiner*—Donovan F. Duggan
*Attorney, Agent, or Firm*—Polster, Polster and Lucchesi

[57] ABSTRACT

A centrifugal actuator for an electric motor starting switch which is rotatable with the rotor shaft of the motor and which is movable axially with respect to the rotor shaft. A spring biases the centrifugal actuator into engagement with a fixed stop carried by the housing of the electric motor so that the position of the centrifugal actuator with respect to the motor starting switch remains fixed and is not affected by axial movement of the rotor shaft within the electric motor housing.

7 Claims, 3 Drawing Figures

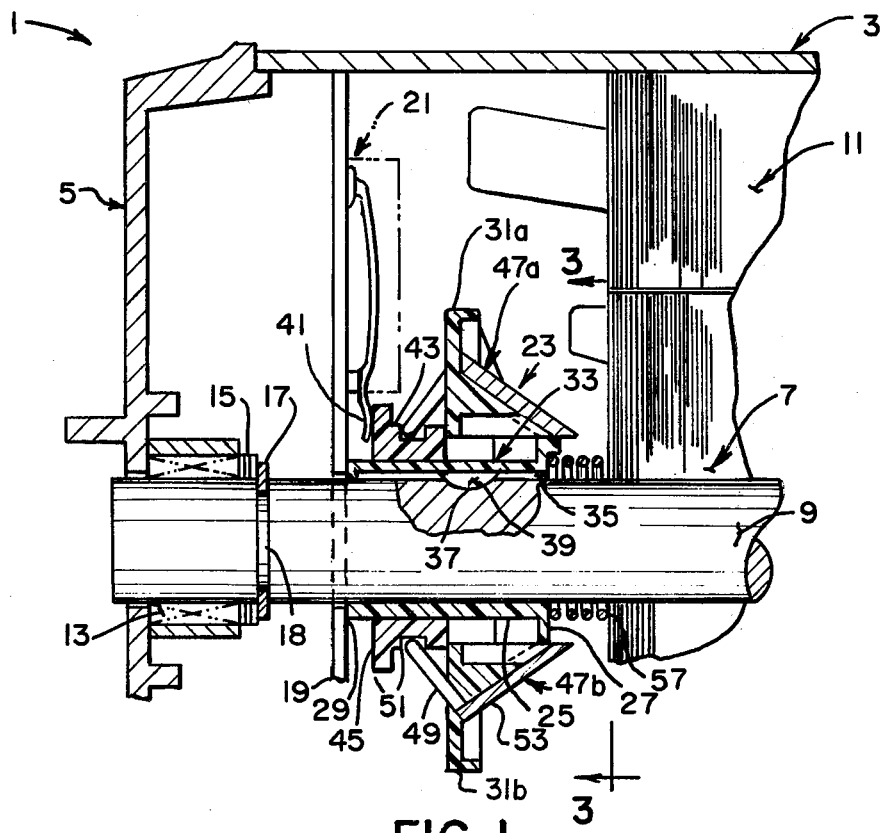
FIG. 1.
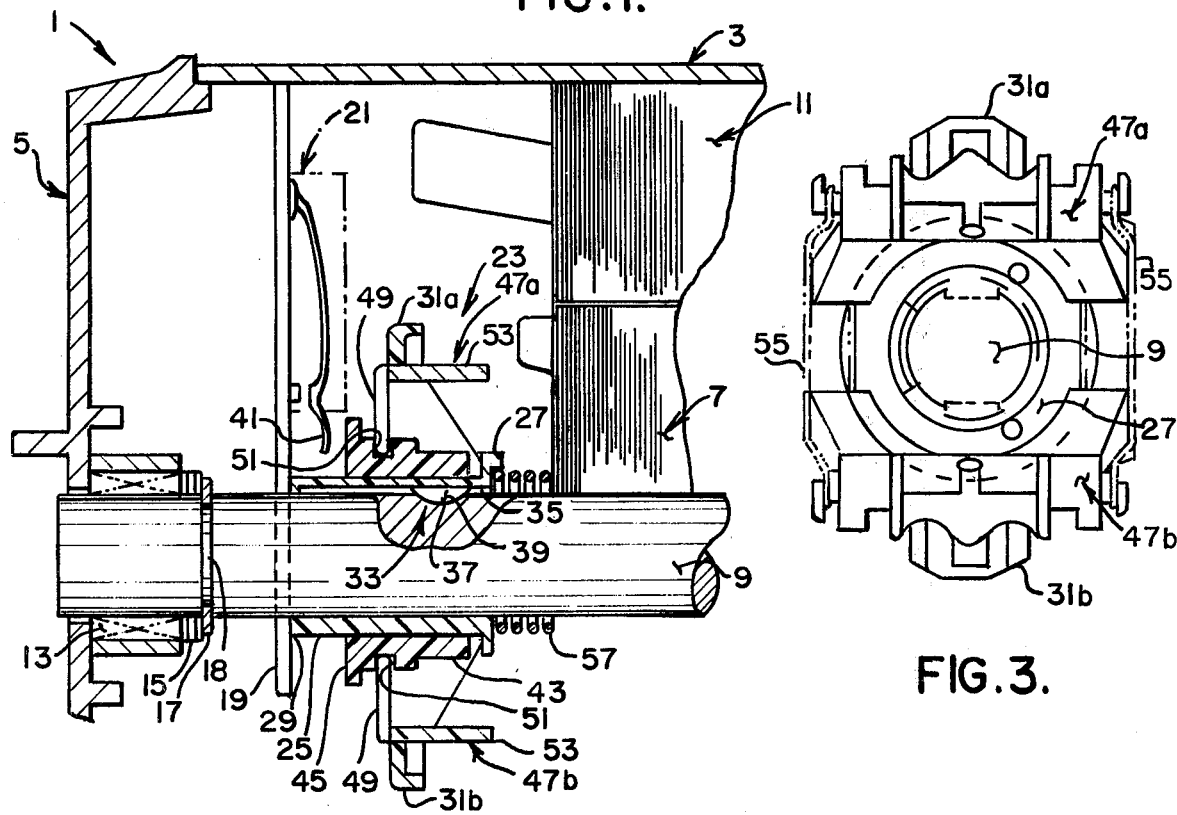
FIG. 2.
FIG. 3.

CENTRIFUGAL ACTUATOR FOR ELECTRIC MOTOR STARTING SWITCH

BACKGROUND OF THE INVENTION

This invention relates to electric motors or to other electric dynamo machines, and more particularly relates to a centrifugal actuator for actuating a motor starting switch which in turn controls energization of the starting winding in the motor in response to the speed of rotation of the motor.

In many conventional electric motors, such as in single phase induction motors, a rotating magnetic field is produced by the use of a main winding and a starting winding. These windings are so designed and arranged within the motor that during startup of the motor, sufficient starting torque is attained. Once the motor reaches a predetermined operational speed, a switch responsive to the rotational speed of the motor is opened so as to deenergize the starting winding. Upon the motor speed slowing below another predetermined speed of operation (e.g., upon shut down of the motor), the switch is closed so that it will energize the starting winding of the motor upon restarting the motor. The switch is operated by a centrifugal actuator.

Heretofore, centrifugal actuators were typically mounted on the rotor shaft of the motor and were rotatable therewith. The motor starting switch was oftentimes secured to the frame or to the end shield of the motor and a movable actuator finger or linkage operatively coupled the motor starting switch to the centrifugal actuator, the latter being fixed on the rotor shaft. Thus, the relative position of the motor starting switch and the centrifugal actuator on the shaft had to be such that the motor starting switch would be actuated upon movement of the centrifugal actuator in response to the motor rotating at its predetermined operational speed.

During manufacture of motors, the rotor shaft is shimmed with end play washers so as to insure that the rotor is properly positioned with respect to the stator in the motor housing. Once the rotor with the centrifugal actuator thereon is fixed or shimmed relative to the motor housing or end shield, the motor starting switch and its actuator finger or linkage is positioned with respect to the centrifugal actuator so as to insure that the motor starting switch will be actuated by the centrifugal actuator at the above-mentioned predetermined operating speed of the motor. As will be appreciated, shimming of the rotor shaft and the accurate positioning and adjustment of the motor starting switch are time consuming and therefore relatively expensive operations in the manufacture of electric motors. Furthermore, electric motors oftentimes develop end play of the rotor shaft relative to the end shields of the motor during use of the motor. With prior centrifugal actuators, if this rotor shaft end play would exceed certain limits, the motor starting switch would not be operated by the centrifugal actuator. Thus, the motor starting switch could fail to deenergize the starting windings which in turn could lead to failure of the starting winding, or the motor starting switch could fail to energize the starting windings and the motor would fail to start.

Reference may be made to U.S. Pat. Nos. 3,271,602, 3,609,421, 3,872,691 and 4,034,173 for certain prior art electric motors with centrifugal starting switches in the same broad category as this invention.

SUMMARY OF THE INVENTION

Among the several objects and features of the present invention may be noted the provision of a centrifugal actuator for an electric motor starting switch which is substantially independent of the axial position of the rotor shaft with respect to the motor housing and which is not affected by axial shifting of the rotor shaft in the motor housing after manufacture of the motor;

The provision of such a centrifugal actuator which reduces the labor and production costs involved in assembling a motor incorporating this centrifugal actuator and which reduces in-service malfunctions of the motor starting switch;

The provision of such a centrifugal actuator which eliminates the need for adjustment of the motor starting switch with respect to the centrifugal actuator;

The provision of such a centrifugal actuator which is positioned relative to the motor starting switch rather than to the rotor shaft; and The provision of such a centrifugal actuator which is easy and inexpensive to manufacture and to install within an electric motor.

Briefly, an electric motor incorporating a centrifugal actuator of the present invention comprises a first end shield, a second end shield, and a stator mounted between the end shields. The stator includes a starting winding adapted to be energized during start up of the motor and to be deenergized during normal operation of the motor. The motor further has a rotor, a shaft affixed to the rotor and journalled on the end shields for rotation of the shaft and the rotor, a motor starting switch for energizing the starting winding during start up and for deenergizing the starting winding once the rotor has accelerated to a predetermined operating speed, a centrifugal actuator carried by and rotatable with the shaft, and a linkage interconnecting the centrifugal actuator and the motor starting switch. The centrifugal actuator includes a main body mounted on and rotatable with the shaft, and a switch actuator member carried by the main body of the centrifugal actuator and operatively connected to the starting switch via the linkage. The switch actuator member is movable axially relative to the main body member between a first position in which the motor starting switch is adapted to energize the starting winding of the motor and a second position in which the starting switch is adapted to deenergize the starting winding. Means carried by the main body responsive to the rotational speed of the shaft is provided for moving the switch actuator member from its first to its second position upon the motor accelerating to the above-mentioned predetermined operating speed and for returning the switch actuator member from its second to its first position upon slowing of the motor. Still further, the centrifugal actuator incorporates means for biasing the switch actuator member toward its first position, and means for mounting the main body of the centrifugal actuator on the rotor shaft in substantially fixed position relative to the motor starting switch. This last-said means incorporates means for rotatably coupling the main body with respect to the rotor shaft and for permitting axial movement of the main body with respect to the rotor shaft whereby the rotor shaft may move axially relative to the main body without affecting operation of the motor starting switch. Other objects and features of this invention will be in part apparent and in part pointed hereinafter.

BRIEF DESCRIPTION OF THE DRAWINGS

FIG. 1 is a partial cross sectional view of one end of an electric motor illustrating a centrifugal actuator of this invention in a first or starting position;

FIG. 2 is a view similar to FIG. 1 illustrating the centrifugal actuator in a second or operating position; and FIG. 3 is a cross sectional view of FIG. 1 taken along line 3—3.

Corresponding reference characters indicate corresponding parts throughout the several views of the drawings.

DESCRIPTION OF A PREFERRED EMBODIMENT

Referring now to the drawings, an electric motor is indicated in its entirety at 1. The motor includes a frame or housing 3 and an end shield 5 at each end of the housing (only one end shield is shown). A rotor 7 is fixed on a rotor shaft 9 for rotation within a stator 11 mounted within the motor housing. More particularly, the ends of rotor shaft 9 are journalled by suitable antifriction bearings 13 carried by the end shields. As is conventional, the rotor is fixed to rotor shaft 9 and, upon assembly of the motor, the rotor is accurately positioned with respect to the stator. At each end of the shaft, end play washers 15 and a snap ring 17 which fits in a groove 18 in the rotor shaft hold the rotor and the rotor shaft fixed in axial direction with respect to the motor housing and with respect to the stator. These end play washers serve as shims and the number of and thickness of the end play washers used will vary from motor to motor so as to individually position each rotor within its respective motor housing. Of course, end play washers 15 and snap ring 17 also transfer thrust loads of the rotor and rotor shaft to the motor housing.

As indicated at 19, a rigid portion of housing 3 surrounds rotor shaft 9 and is referred to as a stop for purposes as will appear. Portion 19 may be any suitable structure, including, for example, a terminal board of the type shown and described in the U.S. patent to Crow, No. 4,034,173 issued July 5, 1977 and assigned to the assignee of the present invention. When so configured, housing portion 19 functions as a mounting plate for a motor starting switch and a motor protector, as indicated generally at 21 and as shown in phantom. The motor starting switch is actuated by a centrifugal actuator of this invention generally indicated at 23. This centrifugal actuator includes a main body 25 of molded synthetic resin or the like axially received on and surrounding shaft 9. The main body is generally in the shape of an elongate cylinder with a flange 27 at one end thereof proximate to rotor 7 and having a plain end 29 distal from the rotor. The main body further includes a pair of brackets 31a, 31b extending radially outwardly from opposite sides of the main body.

In accordance with this invention, centrifugal actuator 23 (and more particularly main body 25) is coupled to shaft 9 for rotation with the shaft, but yet is free to move axially with respect to the shaft. As indicated generally at 33, a spline and keyway arrangement is provided for this purpose. This spline arrangement includes a slot 35 in body member 25 extending parallel to the axis of the shaft and another slot 37 in shaft 9. A spline or key 39, is mounted in the slot 37 in a conventional manner and couples the main body of the centrifugal actuator to shaft 9. Because slot 35 is appreciably longer than spline 39 and because the spline is rigidly mounted on shaft 9 in slot 37, the main body 25 is free to move axially with respect to shaft 9.

In general, motor starting switch 21 does not constitute a part of this invention and thus it will be described in general terms only. As shown, the motor starting switch has an actuating lever or finger 41 which extends from the switch for engagement by a portion of centrifugal actuator 23. It will be understood that the actuating finger serves as a linkage for interconnecting centrifugal actuator 23 and motor starting switch 21 and that this linkage could be of any desired design.

Centrifugal actuator 23 further includes a sleeve or actuator member 43 surrounding main body 25 and coupled to the main body for rotation therewith. This sleeve has a flange 45 facing toward and engagable with actuating finger 41 of motor starting switch 21. Sleeve 43 is axially shiftable on main body 25 from a first position (as shown in FIG. 1) in which flange 45 is in contact with actuating finger 41 so as to effect the closure of motor starting switch 21 and to effect energization of the starting winding of the motor and a second position (as shown in FIG. 2) in which flange 45 is clear of the actuating arm so as to effect the opening of the motor starting switch and to deenergize the starting winding of the motor.

Sleeve 43 is moved between its first and second position by means of a pair of levers 47a, 47b pivotally carried by respective main body brackets 31a, 31b. Each of the levers has a leg 49 which is received in notches 51 in sleeve 43 and a weighted leg 53 at generally right angles to leg 49. A pair of tension springs 55 (see FIG. 3) are stretched between the levers so as to bias them toward a rest position (as shown in FIG. 1) in which sleeve 43 is in its first position. Levers 47a, 47b and springs 55 constitute centrifugal means for moving sleeve 43 on main body 25 in response to the rotational speed of shaft 9. Upon rotor shaft 9 attaining a predetermined rotational speed, weighted legs 53 will be forced outwardly by centrifugal force against the bias springs 55 with consequent pivoting movement of the levers on their respective main body brackets 31a, 31b thereby to axially shift sleeve 43 from its first position to its second position. Thus, flange 45 will move clear of actuating finger or linkage 41 thereby allowing the motor starting switch to open and to deenergize the starting winding of the motor. Upon the motor slowing down below another predetermined operational speed (i.e., upon stopping), springs 55 will overcome the centrifugal force acting on the weighted levers and will axially shift the sleeve from its second to its first position on the main body member to thus again close the motor starting switch. For further details of the structure and operation of the centrifugal actuator levers, reference may be made to the above-noted co-assigned U.S. Pat. No. 3,609,421.

As previously mentioned, centrifugal actuator 23 of this invention is coupled to shaft 9 for rotation therewith and for relative axial movement of its main body 25 with respect to the rotor shaft. Further in accordance with this invention, a compression coil spring 57 is interposed between flange 27 of the main body member and a fixed abutment on shaft 9 (e.g., rotor 7) so as to bias main body 25 toward stop 19. More particularly, spring 57 biases the plain distal end 29 of main body member 25 into engagement with stop 19 and holds the main body in engagement with stop 19 even upon axial movement of rotor shaft 9 relative to the stop. In this manner, the position of flange 45 of sleeve 43 of the centrifugal actuator and motor starting switch 21 is fixed and is maintained constant regardless of axial shifting movement of the rotor shaft 9 relative to the motor housing. Once the relative position of starting switch 21 and sleeve 43 have been established, this relative position will not change due to shifting of the rotor shaft. This in turn prevents any substantial change in the operational speed of the motor at which the motor starting switch is tripped during the life of the motor and eliminates the need to accurately adjust the position of the rotor shaft with the centrifugal actuator thereon relative to the starting switch.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. In an electric motor comprising a first end shield, a second end shield, a stator mounted between said first and second end shields, said stator including a starting winding adapted to be energized during start up of the motor and to be deenergized during normal operation of the motor, a rotor rotatable within said stator, a shaft affixed to said rotor and being journalled in said end shields for rotation with said shaft and rotor, a motor starting switch for energizing said starting winding during startup of the motor and for deenergizing said starting winding once the motor has attained a predetermined operating speed, a centrifugal actuator carried by and rotatable with said shaft, and linkage means interconnecting said centrifugal actuator and said motor starting switch for actuation of the latter, said centrifugal actuator including a main body mounted on and rotatable with said shaft, a switch actuator member operatively connected to said motor starting switch via said linkage, said switch actuator member being carried by said main body for rotation with the latter and being movable axially relative to said main body member between a first position in which said motor starting switch is actuated to energize said starting winding and a second position in which said motor starting switch is actuated to deenergize said starting winding, centrifugal means carried by said main body responsive to the speed of rotation of said shaft for moving said switch actuator member from its first to its second position upon the motor attaining said predetermined operating speed and for returning said switch actuator member from its second to its first position upon slowing of the motor, and means for biasing said centrifugal means toward its first position, wherein the improvement comprises; means for mounting said main body member on said shaft in substantially fixed relation with respect to said motor starting switch, and means for rotatably coupling said main body to said shaft and for permitting axial movement of said shaft relative to said main body whereby the shaft may move axially relative to said main body member without affecting operation of said motor starting switch.

2. In an electric motor as set forth in claim 1 wherein said means for mounting said main body in substantially fixed relation relative to said motor starting switch comprises a stop adjacent said shaft, said stop being substantially rigid with respect to said end shields and carrying said motor starting switch, said shaft having an abutment thereon, said main body of said centrifugal actuator being disposed on said shaft between said stop and said abutment with one end of said main body being engageable with said stop, said mounting means further comprising means for biasing said main body toward said stop whereby said main body remains in engagement with said stop independent of relative axial movement between said shaft and said stop.

3. In an electric motor as set forth in claim 2 wherein said biasing means is a compression spring surrounding said shaft and interposed between said main body member and said abutment.

4. In an electric motor as set forth in claim 3 wherein said abutment is said rotor and said compression spring is interposed between said main body member and said rotor.

5. In an electric motor as set forth in claim 1 wherein said means for rotatably coupling said main body to said shaft comprises a spline and slot arrangement interengaging said shaft and said main body so as to couple said main body to said shaft for rotation therewith.

6. In an electric motor as set forth in claim 5 wherein said spline and slot arrangement comprises a key, a slot in said shaft, another slot in said main body, both of said slots extending axially with respect to said shaft, and a spline interengaging both of said slots thereby to rotatably couple said main body to said shaft, one of said slots being longer than said spline so as to permit limited axial movement of said main body on said shaft.

7. In a centrifugal actuator for an electric motor starting switch for use in an electric motor, said motor having a frame, a shaft journalled in said frame, and a rotor mounted on said shaft for rotation therewith, means associated with said frame including a portion thereof adjacent said shaft constituting a stop, said actuator comprising a main body adapted to be received on said shaft, means for rotatably coupling said main body and said shaft, a sleeve surrounding said main body, said sleeve being movable axially with respect thereto and being rotatable therewith, said sleeve having a portion thereof adapted for actuation of said motor starting switch, and said centrifugal actuator having centrifugal responsive means carried by said main body for axially shifting said sleeve on said main body from a first position to a second position upon said shaft attaining a predetermined speed of operation and for returning said sleeve to its first position upon slowing of the motor, wherein the improvement comprises; spline means interengaging said main body and said shaft for rotatably coupling said main body to said shaft and for permitting axial movement of said main body with respect to said shaft, said spline means constituting the above said coupling means, one end of said main body distal from said rotor being engagable with said stop, and a spring between the other end of said main body and said rotor for resiliently biasing said main body toward said stop and for maintaining said one end of said main body in engagement with said stop whereby the position of said main body with respect to said motor starting switch is maintained independent of the position of said shaft with respect to said frame.

* * * * *